(12) United States Patent
Meijer et al.

(10) Patent No.: US 8,539,439 B2
(45) Date of Patent: Sep. 17, 2013

(54) ASYNCHRONOUS PROGRAMMING MODEL MAPPING

(75) Inventors: Henricus Johannes Maria Meijer, Mercer Island, WA (US); John Wesley Dyer, Monroe, WA (US); Lucian Wischik, Seattle, WA (US); Bart De Smet, Bellevue, WA (US); Jeffrey Van Gogh, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/273,177

(22) Filed: Oct. 13, 2011

(65) Prior Publication Data

US 2013/0097580 A1 Apr. 18, 2013

(51) Int. Cl.
*G06F 9/44* (2006.01)
*G06F 17/00* (2006.01)

(52) U.S. Cl.
USPC .......................................... 717/104; 707/608

(58) Field of Classification Search
USPC ........................................................ 717/104
See application file for complete search history.

(56) References Cited

U.S. PATENT DOCUMENTS

| | | | |
|---|---|---|---|
| 6,601,233 B1 * | 7/2003 | Underwood | 717/102 |
| 7,526,503 B2 * | 4/2009 | Bernstein et al. | 707/103 |
| 7,660,890 B2 | 2/2010 | Banerjee | |
| 7,703,077 B2 * | 4/2010 | Rehof et al. | 717/127 |
| 8,230,357 B2 * | 7/2012 | Winkler et al. | 715/771 |
| 2007/0033570 A1 * | 2/2007 | Kong | 717/104 |
| 2008/0270974 A1 * | 10/2008 | Topchiyski et al. | 717/104 |
| 2009/0049422 A1 * | 2/2009 | Hage et al. | 717/104 |
| 2010/0076805 A1 | 3/2010 | Batsakis et al. | |
| 2010/0131921 A1 | 5/2010 | Dyer et al. | |
| 2011/0072410 A1 * | 3/2011 | Lee et al. | 717/104 |

OTHER PUBLICATIONS

Wesdyer, "A Brief Introduction to the Reactive Extensions for .NET, Rx", Retrieved at <<http://blogs.msdn.com/b/wesdyer/archive/2009/11/18/a-brief-introduction-to-the-reactive-extensions-for-net-rx.aspx>>, Nov. 18, 2009, pp. 7.

Bartel, Jan, "Proposed Asynchronous Servlet API", Retrieved at <<http://www.theserverside.com/news/thread.tss?thread_id=40560>>, May 23, 2006, pp. 21.

Petricek, et al., "F# Web Tools: Rich Client/Server Web Applications in F#", Retrieved at <<http://www.cl.cam.ac.uk/~tp322/theses/webtools-report.pdf>>, Retrieved Date: Jul. 12, 2011, pp. 12.

Saloranta, Tatu "Non-blocking XML parsing with Aalto 0.9.7", Retrieved at <<http://www.cowtowncoder.com/blog/archives/2011/03/entry_451.html>>, Mar. 12, 2011, pp. 3.

Unknown "The Reactive Extensions (Rx)", Retrieved at <<http://msdn.microsoft.com/en-us/data/gg577609>>, Retrieved Date: Jul. 12, 2011, pp. 2.

* cited by examiner

*Primary Examiner* — Don Wong
*Assistant Examiner* — Mohammad Kabir

(57) ABSTRACT

Mapping is performed between operations of an abstract asynchronous programming model and a concrete asynchronous programming model. In other words, differences between asynchronous programming models are bridged to enable interaction.

20 Claims, 5 Drawing Sheets

US 8,539,439 B2

ASYNCHRONOUS PROGRAMMING MODEL MAPPING

BACKGROUND

Asynchronous programming is increasing in popularity over synchronous programming. Synchronous programming involves specifying computations execute sequentially such that a second computation is started only after a first computation has terminated. However, synchronous programming can be problematic in light of high latency operations including file and network access as well as long running computations. In particular, with synchronous programming a program is blocked from performing additional work until a preceding computation is completed. Asynchronous programming involves specification of computation in a manner that allows additional work to be performed while a computation is executed. Upon completed execution, a program can be notified of the results by way of a callback, for example. Asynchronous programming has been resisted mainly because asynchronous programming is more difficult than synchronous programming. However, efficiency gains and the popularity of network-based applications is overcoming this resistance and tipping the scale toward asynchronous programming.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure generally pertains to asynchronous programming model mapping. More specifically, operations of an abstract asynchronous programming model can be mapped, or converted to one or more semantically equivalent concrete asynchronous programming model operations and vice versa. In this manner, the abstract asynchronous programming model and the concrete asynchronous programing model can interact and enable programmers to specify asynchronous operations with respect to the abstract asynchronous programming model as opposed to a concrete asynchronous programming model, which is typically more difficult to use than the abstract asynchronous programming model.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Details below are generally directed toward mapping between an abstract asynchronous programming model and a concrete asynchronous programming model. An abstract asynchronous programming model facilitates asynchronous programming independent of any particular program. By contrast, a concrete asynchronous programming model aids asynchronous programming with respect to a specific program. By way of example and not limitation an abstract asynchronous programming model can correspond to a software library, or framework, employable by numerous programming languages to aid generation of asynchronous and event-based programs, and a concrete asynchronous programming model can relate to asynchronous functionality afforded by an a program, such as an operating system. While both models enable asynchronous programming, the models can implement and expose such functionality differently. As provided herein, however, differences can be bridged to allow interaction and thus an improved programming experience.

Various aspects of the subject disclosure are now described in more detail with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
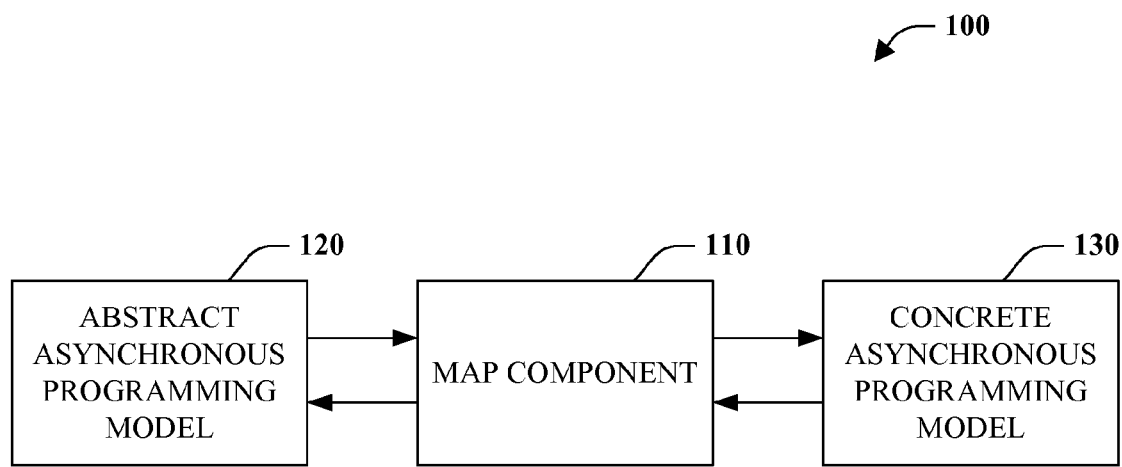
FIG. 1 is a block diagram of a mapping system.

Referring initially to FIG. 1, mapping system 100 is illustrated. The mapping system 100 comprises map component 110 configured to map, or in other words convert, between abstract asynchronous programming model 120 and concrete asynchronous programming model 130. Stated differently, the map component 110 is configured to map operations of the abstract asynchronous programming model to one or more operations of the concrete asynchronous programming model 130 or vice versa.

The abstract asynchronous programming model 120 facilitates asynchronous programming independent of a particular program. In one instance, the abstract asynchronous programming model 120 can be embodied as a library, or framework, employable with respect to one or more programming languages to aid generation of asynchronous and event-based programs utilizing observable (e.g., asynchronous, push-based) sequences (e.g., non-persisted, potentially lazily evaluated), or in other words, data streams. Furthermore, language integrated query operators can be supported by the abstract asynchronous programming model 120 to allow queries to be written in a declarative manner over one or more data streams. In one instance, library or framework functionality can be exposed by way of an application programming interface (API). Accordingly, a programmer can employ such functionality by specifying calls to an API from within a programming language of choice including, but not limited to, C#®, Visual Basic®, or JavaScript®.

The concrete asynchronous programming model 130 aids asynchronous programming with respect to specific program. The concrete asynchronous programming model 130 can provide asynchronous functionality for a particular program and expose such functionality through an application programming interface (API). By way of example, and not limitation, an operating system can provide a uniform API to enable asynchronous program interaction. Conventionally, concrete asynchronous programming models and associated APIs reflect the low-level details regarding how a program operates. Accordingly, such models and APIs are typically imperative and stateful. In other words, a series of operations are specified that change state, and the result of any operation depends on the results of previous operations. For example, an object can be created, but not started, and later started and employed.

An abstract asynchronous programming model 120 is easier to use than the concrete asynchronous programming model 130. In fact, the abstract asynchronous programming model 120 can be designed to be easy for a programmer to use. The concrete asynchronous programming model 130 is easy to define since it reflects implementation details. However, the concrete asynchronous programming model 130 does nothing to make it easier for a programmer to use. The map component 110 can enable an abstract asynchronous programming model 120 to interact with a concrete asynchronous programming model 130 and thus make it easier than otherwise possible to employ asynchronous functionality of a particular program such as an operating system.

By analogy, the concrete asynchronous programming model 130 is like an old car that requires a driver to go to the front of the car, insert a hand crank directly in the drive shaft, and turn the crank to start the car's engine. The abstract asynchronous programming model 120 is like a modern electric motor, which can be employed in conjunction with an engine to rotate the engine to start the car. The electric motor hides some of the details from a driver and is much easier to use, since the driver does not have to get out of the car to start the engine but can simply push a button and the electric motor will start the engine.

In addition to allowing usage in the context of a plurality of programming languages including, for example, a browser scripting language (e.g., JavaScript), the abstract asynchronous programming model 120 can hide differences amongst multiple concrete asynchronous programming models behind a common interface. Accordingly, it can be said that the abstract asynchronous programming model 120 virtualizes, or is a virtualization of, concrete asynchronous programming models and/or associated APIs.

Figure 2:
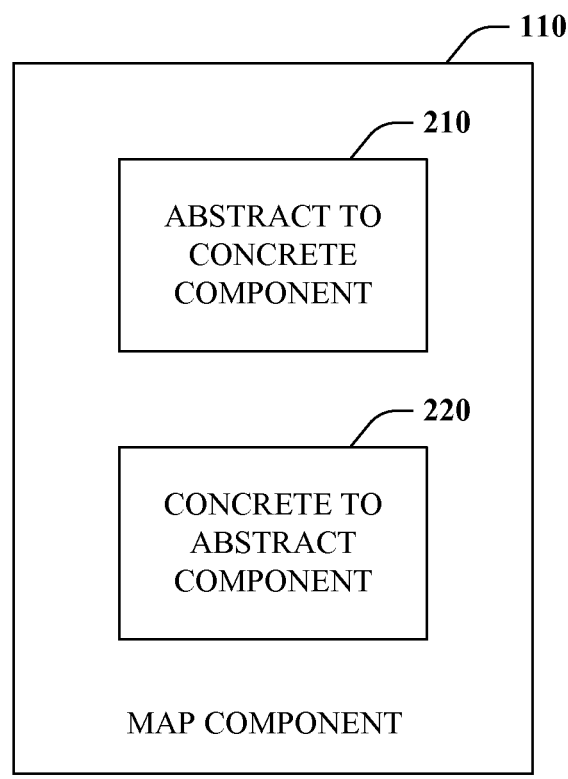
FIG. 2 is a block diagram of a representative map component.

Turning attention to FIG. 2, a representative map component 110 is shown in further detail. Here, the map component 110 includes two subcomponents: abstract-to-concrete component 210 and concrete-to-abstract component 220. The abstract-to-concrete component 210 is configured to map, or convert, operations of an abstract asynchronous programming model to operations of a concrete asynchronous programming model. The concrete-to-abstract component 220 is configured to map, or convert, operations of a concrete asynchronous programming model to operations of an asynchronous programming model. As a result, a user can utilize an abstract asynchronous programming model to specify asynchrony, which can be mapped to corresponding operations of a concrete asynchronous programming model, and results can be converted from a concrete representation back to an abstract representation.

What follows is a description regarding two exemplary asynchronous programming models and mapping between the models. More concretely, mapping between interfaces (e.g., APIs) associated with the models is described. The description is not intended to limit the scope of the appended claims but rather to facilitate clarity and understanding regarding aspects of the disclosure.

The abstract asynchronous programming model can enable interaction with push-based observable sequences (as opposed to pull-based enumerable sequences) utilizing "IObserver" and "IObservable" interfaces with the following signatures:

```
public interface IObservable<out T>
{
    IDisposable Subscribe(IObserver<T> observer);
}
public interface IObserver<in T>
{
    void OnNext(T value);
    void OnError(Exception exception);
    void OnCompleted( );
}
```

The "IObservable" interface is implemented by a sequence to be observed, wherein elements of the sequence take time to be computed. Its single method "Subscribe" can be utilized to subscribe to an observable sequence. The "IObserver" interface is utilized to observe values of the observable sequence and receive notifications. More particularly, "OnNext" sends the next value from the sequence, "OnError" provides notification of an error/exception, and "OnCompleted" provides notification that the observable sequence has finished sending values. In other words, an observable maintains a list of dependent observers that subscribe to the observable and notifies the observers automatically upon state change. Further, an observer can unsubscribe to an observable by calling a function "Dispose" on a disposable object returned upon subscription.

As a result, one or more observable sequences, or data streams, can be produced and generic language integrated query operators can be utilized to manipulate these objects. Most operators take a data stream, perform some logic (e.g., projection, filter, group, aggregate, partition, join, order . . . ) on it, and output another data stream that captures the results of the logic. In addition, multiple operators can be chained together on a source stream to produce specific resulting data stream. Consequently, compositionality is inherently supported.

The concrete asynchronous programming model can also deal with push-based data but can differ in implementation as well as supported functionality. Below is an exemplary model formalized by the COM (Component Object Model) interface below:

```
typedef enum {Created, Started, Progressed, Completed, Cancelled, Error}
AsyncStatus;
coclass QueryEventSource
{
    interface IAsyncInfo;
    [default] interface IQueryEventSource;
    [default, source] dispinterface _IQueryEventSourceEvents;
};
interface IAsyncInfo : IUnknown
{
    [propget] int Id( );
    [propget] AsyncStatus Status( );
    [propget] long ErrorCode( );
    HRESULT Start( );
    HRESULT Cancel( );
    HRESULT Close( );
};
interface IQueryEventSource : IUnknown
{
    HRESULT GetResults([out, retval] IConcurrentStringList
    **result);
};
```

-continued

```
dispinterface _IQueryEventSourceEvents
{
    properties:
    methods:
        [id(1), helpstring("method OnAsyncCompletedEvent")]
        HRESULT
OnAsyncCompletedEvent([in] IAsyncInfo *info);
        [id(2), helpstring("method OnQueryProgressEvent")] HRESULT
OnQueryProgressEvent ([in] IAsyncInfo *info, [in] int Progress);
};
```

This model is imperative and stateful. Stated differently, the model relies on a series of operations that change state, and the outcome of a given operation is dependent upon state resulting from previous operations. Note the supported "AsyncStatus," namely created, started, progressed, completed, cancelled, and error. Such statuses are indicative of the manner in which asynchrony is supported. Here, an event source, such as user-interface element, must first be created and subsequently started. Such an event source can be called "cold" in the sense that it is not running until the event source is started. Similarly, and as provided in "AsyncInfo," an operation can be cancelled, and a cancelled operation can subsequently be closed. Further, the status "progressed" provides a notification that an event has been provided, and the intended meaning of "GetResults" is to yield results that have been collected thus far. Thus, upon receipt of a notification of "progressed," "GetResults" can be called to acquire all results that have been collected up to that point.

By contrast, the abstract asynchronous programming model described above is declarative and based on observable sequences/data streams. In other words, a desired result is described without specifying a series of operations to achieve the result, and operations are performed with respect to sequences of data in a compositional manner.

Model differences can be bridged to enable interaction. Simply stated, "m" abstract operations can be mapped to "n" concrete operations, wherein "n" and "m" can, but need not, be the same. There can be several direct mappings, for example, "Subscribe" can be mapped to "Start," "Dispose" can be mapped to "Cancel," "OnComplete" can be mapped to "OnAsyncCompletedEvent," among others. Additional code can be injected to handle variations in operations.

Consider a progress operation, for instance. The concrete asynchronous programming model can support progress where a notification "progressed" is provided that indicates a value has been received, and subsequently, a "GetResults" operation can be executed to acquire all values up to that point. Code can be injected with respect to "OnNext" of the abstract asynchronous programming model to return not only the value received but also all the results received thus far or to ensure calls to "OnNext" expose disjoint segments of an observable sequence, that is without overlap such that concatenation of "OnNext" messages corresponds to an entire underlying sequence being produced (e.g., by the concrete implementation). By way of example, and not limitation, suppose an asynchronous computation is performed that returns ten results. Here, a notification can be provided with a list of a first result, then a notification can be provided with a list of the first result and a second result, subsequently a notification can be provided with a list of the first, second, and third results, etc.

The APPENDIX hereinafter provides details regarding one particular implementation of mapping functionality. In particular, a pulse buffer is an observable subject that implements "IObservable<IEnumerable<T>>." In other words, the pulse buffer is a collection of lists of results produced thus far, wherein the "IEnumerable<T>" represents a list of growing values. Alternatively, the "IEnumerable<T>" can represent a disjoint segment of an observable sequence that exhibits the property of: "$XS_{concrete} = XS_{abstract}$.Concate( )," where "$XS_{concrete}$" is the concrete model's produced sequence (e.g., byte sequence from a file, sent in chunks) and "$XS_{abstract}$" is the abstract model's (observable) sequence of enumerable fragment-including (e.g., byte[ ] chunks) sequences. Further, this subject can be started and cancelled to replicate functionality of the exemplary concrete asynchronous programming model.

As another example, when mapping from the concrete model to the abstract model, code can be employed to produce data streams over which the abstract model can operate. For example, with respect to "Created" and "Started" two events streams can be produced: one for "Created" events and one for "Started" events. Alternatively, a single event stream can be generated that includes two different event types, "Created" and "Started," and a single event stream.

In accordance with one aspect of the disclosure, the abstract asynchronous programming model is independent of any particular programming language as well as concrete asynchronous programming model. Accordingly, the abstract asynchronous programming model provides programmers with a uniform interface to program against arbitrary concrete asynchronous APIs from arbitrary programming languages. For instance, a user can employ the abstract asynchronous programming model from within C#®, Visual Basic®, or JavaScript® (browser scripting language) to target one or more concrete asynchronous programming mechanisms, such as two distinct asynchronous operating system APIs. As asynchronous computations becomes increasingly popular so will concrete asynchronous APIs. Mappings, conversions, or the like can then be provided from the abstract asynchronous programming model as implemented with respect to a particular programming language to specific concrete asynchronous implementations to aid users in asynchronous programming by among other things hiding details of the concrete implementation. Further, the compositional nature of the abstract asynchronous programming model can make it easier to capture desired functionality, and a declarative approach can further be of assistance to enable a desired result to be specified rather than specific steps that achieve the results. Further yet, since the abstract asynchronous programming interface is separate from a concrete implementation, it is easy to cross machine boundaries, for example using a proxy object, which is beneficial in the context of distributed and cloud-based computing.

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, various portions of the disclosed systems above and methods below can include or employ of artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, such mechanism can be employed with respect to a mapping to enable optimized interaction.

Figure 3:
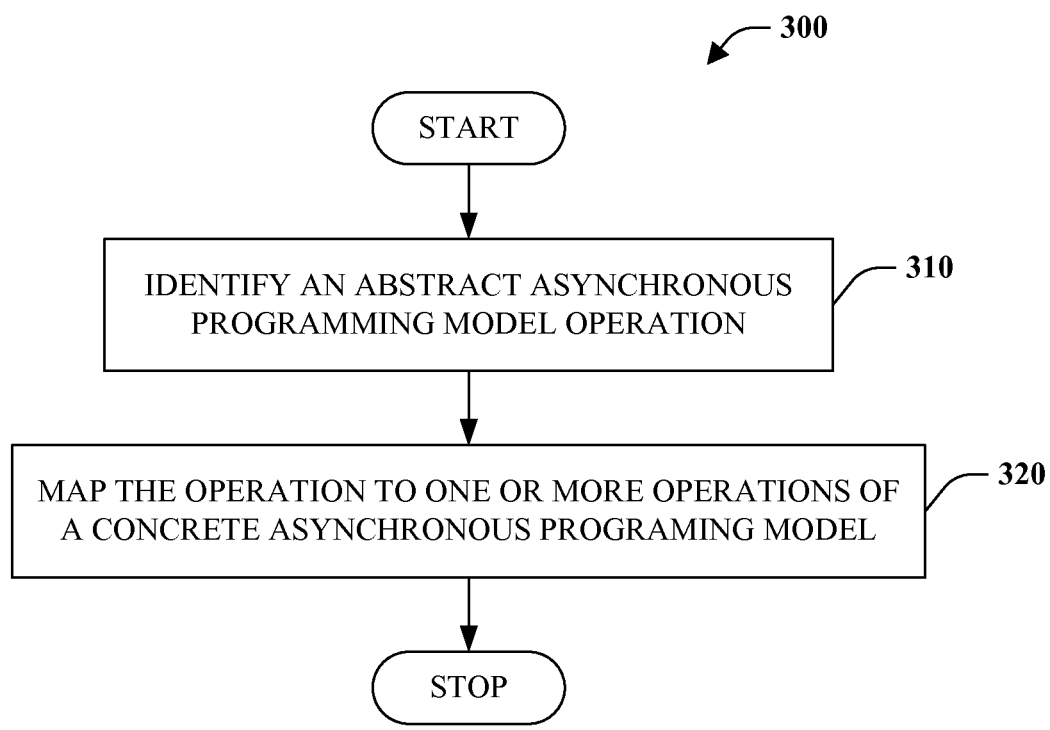
FIG. 3 is a flow chart diagram of a method of mapping between asynchronous programming models.
Figure 4:
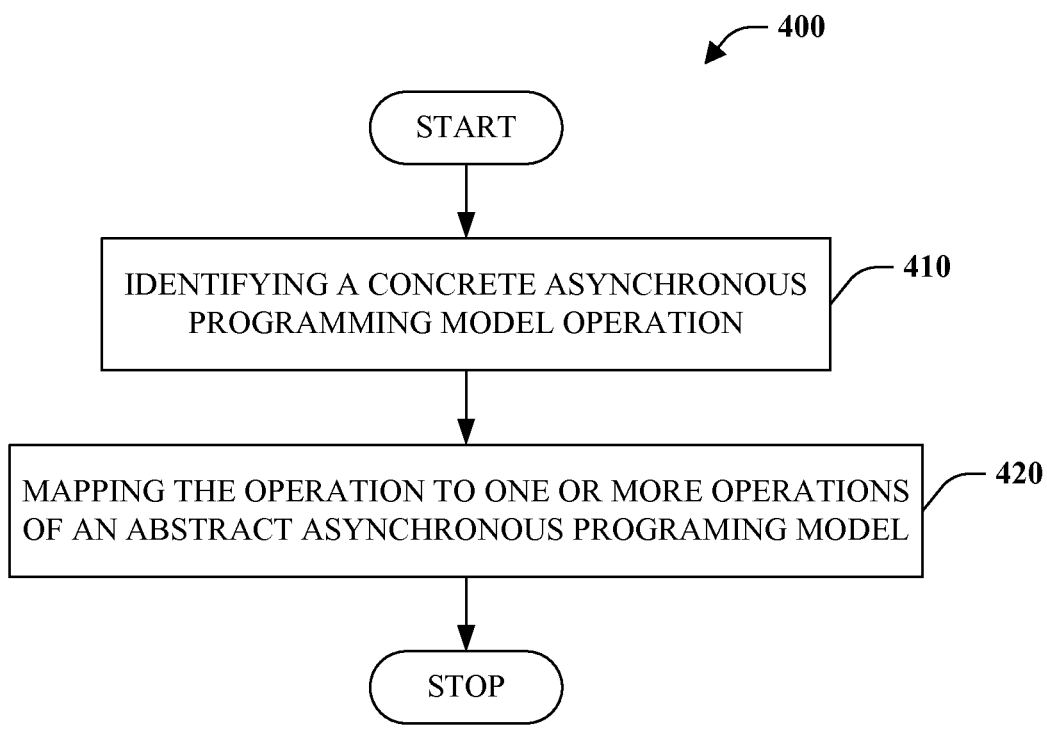
FIG. 4 is a flow chart diagram of a method of mapping between asynchronous programming models.

In view of the exemplary systems described supra, methodologies that may be implemented in accordance with the disclosed subject matter will be better appreciated with reference to the flow charts of FIGS. 3 and 4. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Referring to FIG. 3, a method of asynchronous program model mapping is illustrated. At reference numeral 310, an operation of an abstract asynchronous programming model is identified. An abstract asynchronous programming model facilitates asynchronous programming in a manner generally disassociated from a particular program. In one instance, the abstract asynchronous programming model can be embodied as a library, or framework, for generating asynchronous and event-based programs utilizing observable (e.g., asynchronous, push-based) sequences, or in other words, data streams. Furthermore, one or more language integrated query operators can be specified over such a data stream. At numeral 320, the operation is mapped or converted to one or more operations of a concrete asynchronous programming model that aids asynchronous programming with respect to specific program such as an operating system. A concrete asynchronous programming model is typically tightly tied to low-level implementation details of a specific program. As a result, operations are likely imperative and stateful. Abstract operations, which are generally declarative and stream based, can be mapped to such concrete operations and/or representations. Mapping can comprise converting one or more abstract operations to one or more semantically equivalent operations in accordance with a map, for instance. In some situations, mapping can be one-to-one in other situations one-to-many. By way of example, and not limitation, an abstract "Dispose" operation can be mapped directly to a concrete "Cancel" operation and an abstract "Subscribe" operation can be mapped to concrete "Create" and "Start" operations.

Referring to FIG. 4, a method of asynchronous program model mapping is illustrated. At reference numeral 410, a concrete asynchronous programing model operation is identified. In accordance with one embodiment, a concrete asynchronous programming model can correspond to an operating system program that provides support for asynchronous functionality by way of an API. At reference numeral 420, the concrete operation is mapped or converted to one or more operations of abstract asynchronous programming model of equivalent meaning. In other words, semantics are preserved but the representation is altered. In one instance, the concrete operations can correspond to provisioning an asynchronous result. Accordingly, a corresponding notification can be called in a manner supported by the abstract asynchronous programming model. Further, as previously described herein, the abstract asynchronous programming model can support interaction with data streams so results can be added to one or more data streams to enable interaction.

As used herein, the terms "component" and "system" as well as forms thereof are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner It is to be appreciated a myriad of additional or alternate examples of varying scope could have been presented, but have been omitted for purposes of brevity.

The conjunction "or" as used in this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y,'" or "'A' employs both 'A' and 'B,'" then "'A' employs 'X' or 'Y'" is satisfied under any of the foregoing instances.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 5:
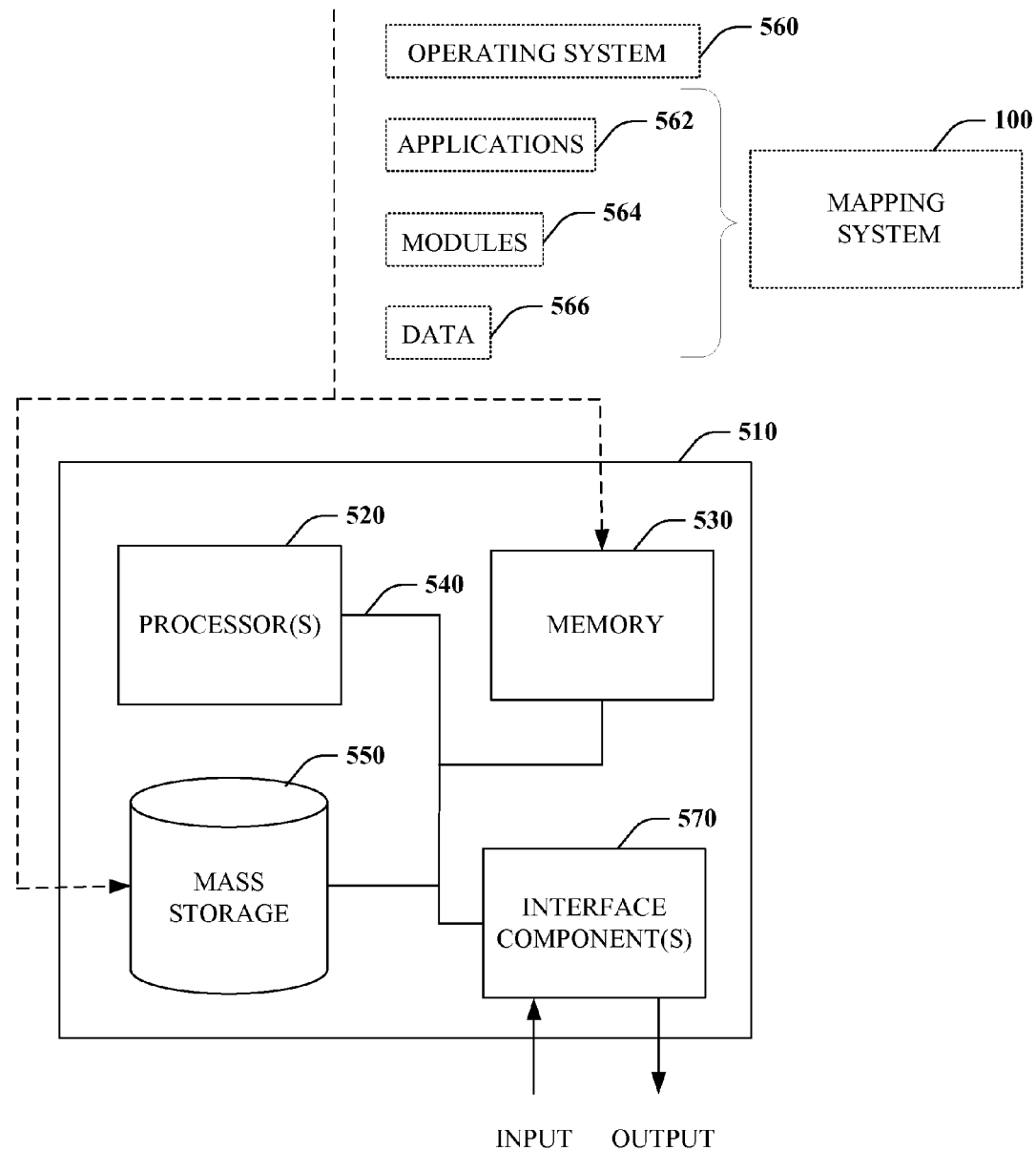
FIG. 5 is a schematic block diagram illustrating a suitable operating environment for aspects of the subject disclosure.

In order to provide a context for the claimed subject matter, FIG. 5 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory storage devices.

With reference to FIG. 5, illustrated is an example general-purpose computer 510 or computing device (e.g., desktop, laptop, server, hand-held, programmable consumer or industrial electronics, set-top box, game system . . . ). The computer 510 includes one or more processor(s) 520, memory 530, system bus 540, mass storage 550, and one or more interface components 570. The system bus 540 communicatively couples at least the above system components. However, it is to be appreciated that in its simplest form the computer 510 can include one or more processors 520 coupled to memory 530 that execute various computer executable actions, instructions, and or components stored in memory 530.

The processor(s) 520 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 520 may also be implemented as a combination of computing devices, for example a combination of a DSP and a microprocessor, a plurality of microprocessors, multi-core processors, one or more microprocessors in conjunction with a DSP core, or any other such configuration.

The computer 510 can include or otherwise interact with a variety of computer-readable media to facilitate control of the computer 510 to implement one or more aspects of the claimed subject matter. The computer-readable media can be any available media that can be accessed by the computer 510 and includes volatile and nonvolatile media, and removable and non-removable media. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other medium which can be used to store the desired information and which can be accessed by the computer 510.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 530 and mass storage 550 are examples of computer-readable storage media. Depending on the exact configuration and type of computing device, memory 530 may be volatile (e.g., RAM), non-volatile (e.g., ROM, flash memory . . . ) or some combination of the two. By way of example, the basic input/output system (BIOS), including basic routines to transfer information between elements within the computer 510, such as during start-up, can be stored in nonvolatile memory, while volatile memory can act as external cache memory to facilitate processing by the processor(s) 520, among other things.

Mass storage 550 includes removable/non-removable, volatile/non-volatile computer storage media for storage of large amounts of data relative to the memory 530. For example, mass storage 550 includes, but is not limited to, one or more devices such as a magnetic or optical disk drive, floppy disk drive, flash memory, solid-state drive, or memory stick.

Memory 530 and mass storage 550 can include, or have stored therein, operating system 560, one or more applications 562, one or more program modules 564, and data 566. The operating system 560 acts to control and allocate resources of the computer 510. Applications 562 include one or both of system and application software and can exploit management of resources by the operating system 560 through program modules 564 and data 566 stored in memory 530 and/or mass storage 550 to perform one or more actions. Accordingly, applications 562 can turn a general-purpose computer 510 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, the mapping system 100, or portions thereof, can be, or form part, of an application 562, and include one or more modules 564 and data 566 stored in memory and/or mass storage 550 whose functionality can be realized when executed by one or more processor(s) 520.

In accordance with one particular embodiment, the processor(s) 520 can correspond to a system on a chip (SOC) or like architecture including, or in other words integrating, both hardware and software on a single integrated circuit substrate. Here, the processor(s) 520 can include one or more processors as well as memory at least similar to processor(s) 520 and memory 530, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the mapping system 100 and/or associated functionality can be embedded within hardware in a SOC architecture.

The computer 510 also includes one or more interface components 570 that are communicatively coupled to the system bus 540 and facilitate interaction with the computer 510. By way of example, the interface component 570 can be a port (e.g., serial, parallel, PCMCIA, USB, FireWire . . . ) or an interface card (e.g., sound, video . . . ) or the like. In one example implementation, the interface component 570 can be embodied as a user input/output interface to enable a user to enter commands and information into the computer 510 through one or more input devices (e.g., pointing device such as a mouse, trackball, stylus, touch pad, keyboard, microphone, joystick, game pad, satellite dish, scanner, camera, other computer . . . ). In another example implementation, the interface component 570 can be embodied as an output peripheral interface to supply output to displays (e.g., CRT, LCD, plasma . . . ), speakers, printers, and/or other computers, among other things. Still further yet, the interface component 570 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

APPENDIX

```
public class PulseBuffer<T> : IObservable<IEnumerable<T>>
{
    class State
    {
        public List<T> values = new List<T>( );
        public Exception exception;
        public bool completed;
    }
    private readonly Subject<IEnumerable<T>> _subscribers = new Subject<IEnumerable<T>>( );
    private readonly IObservable<Notification<T>> _src;
    private readonly BehaviorSubject<State> _state = new BehaviorSubject<State>(new State( ));
    private readonly IObservable<Unit> _pulses;
    public PulseBuffer(IObservable<T> src, IObservable<Unit> pulses)
    {
        this._src = src.Materialize( );
        this._pulses = pulses;
        Observable.Join
            (_state.And(_src).Then((state, value) =>
            {
                switch (value.Kind)
                {
                    case NotificationKind.OnNext:
                        state.values.Add(value.Value);
```

APPENDIX-continued

```
                        _state.OnNext(state);
                        break;
                    case NotificationKind.OnError:
                        state.exception = value.Exception;
                        _state.OnNext(state);
                        break;
                    case NotificationKind.OnCompleted:
                        state.completed = true;
                        _state.OnNext(state);
                        break;
                }
                return new Unit( );
            })
            , _state.And(_pulses).Then((state, pulse) =>
            {
                if(state.completed)
                {
                    _subscribers.OnNext(state.values.Select(x
                        => x));
                    _subscribers.OnCompleted( );
                    _state.OnCompleted( );
                }
                else if(state.exception != null)
                {
                    _subscribers.OnNext(state.values.Select(x
                        => x));
                    _subscribers.OnError(state.exception);
                    _state.OnCompleted( );
                }
                else
                {
                    _subscribers.OnNext(state.values.Select(x
                        => x));
                    _state.OnNext(new State( ));
                }
                return new Unit( );
            })
            ).Subscribe( );
    }
    public IDisposable Subscribe(IObserver<IEnumerable<T>> observer)
    {
        return _subscribers.Subscribe(observer);
    }
}
```

What is claimed is:

1. A method of facilitating asynchronous programming, comprising:
employing at least one processor configured to execute computer-executable instructions stored in memory to perform the following acts:
mapping between operations of a first model and a second model, the first model is an abstract asynchronous programming model and the second model is a concrete asynchronous programming model.

2. The method of claim 1, mapping an operation of the second model to one or more data streams supported by the first model.

3. The method of claim 2, mapping multiple operations of the second model to a single data stream of the first model with multiple types.

4. The method of claim 2, mapping a progress operation of the second model to a data stream of lists of increasing size, a list comprises acquired values that represent progress.

5. The method of claim 2, mapping a data stream of the first model to an operation of the second model.

6. The method of claim 5, mapping a data stream of lists of increasing size, comprising acquired values, to a progress operation, wherein a list identifies progress.

7. The method of claim 1, mapping between the operations of the first model specified in context of a web browser scripting language.

8. The method of claim 1, mapping create and start operations of the second model to a subscribe operation of the first model.

9. The method of claim 1, mapping one or more of concrete cancel or close operations of the second model to an operation of disposing of a subscription of the first model.

10. A system that facilitates asynchronous programming, comprising:
a processor coupled to a memory, the processor configured to execute the following computer-executable components stored in the memory:
a first component configured to map between an abstract asynchronous programming model and a concrete asynchronous programming model.

11. The system of claim 10, the first component is configured to map an operation from the concrete asynchronous programming model to a data stream supported by the abstract asynchronous programming model.

12. The system of claim 11, the first component is configured to map two or more operations to a single data stream with multiple types.

13. The system of claim 10, the first component is configured to map a progress operation of the concrete asynchronous programming model to a data stream comprising one or more lists of asynchronous values from the abstract asynchronous programming model.

14. The system of claim 10, the first component is configured to map an operation of the abstract asynchronous programming model to a stateful operation in the concrete asynchronous programming model.

15. The system of claim 10, the concrete asynchronous programming model is imperative and stateful and the abstract asynchronous programming model is declarative and compositional.

16. The system of claim 10, the concrete asynchronous programming model is an operating system that supports asynchronous interaction through an application programming interface.

17. A computer-readable storage medium having instructions stored thereon that enable at least one processor to perform a method upon execution of the instructions, the method comprising:
converting an operation specified in accordance with an abstract asynchronous programming model into a semantically equivalent operation supported by a concrete asynchronous programming model.

18. The method of claim 17 further comprises transforming an operation of the concrete asynchronous programming model into a semantically equivalent operation supported by the abstract asynchronous programming model.

19. The method of claim 18, transforming a result of an asynchronous computation or an event into one or more data streams.

20. The method of claim 18, transforming two or more events into a single data stream with multiple event types.

* * * * *